June 18, 1968 G. W. NEIIENDAM 3,388,469
MEANS FOR REMOVING OR SLICING LAYERS OF BAKED
GOODS FROM CONTAINERS
Filed July 8, 1965 2 Sheets-Sheet 2
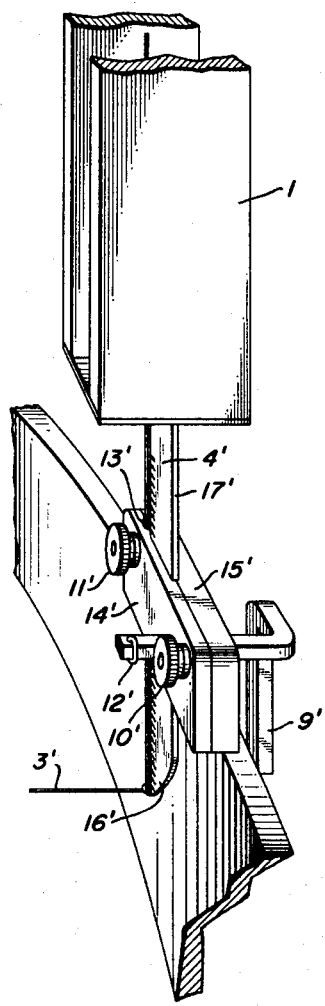
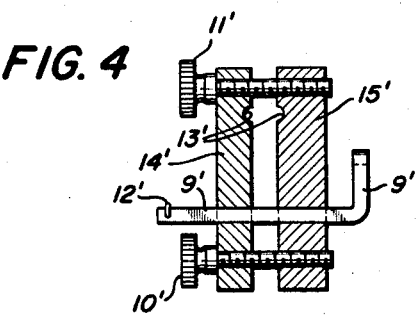
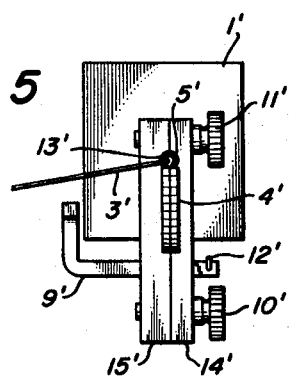
INVENTOR.
GEORGE W. NEIIENDAM 3,388,469
Patented June 18, 1968

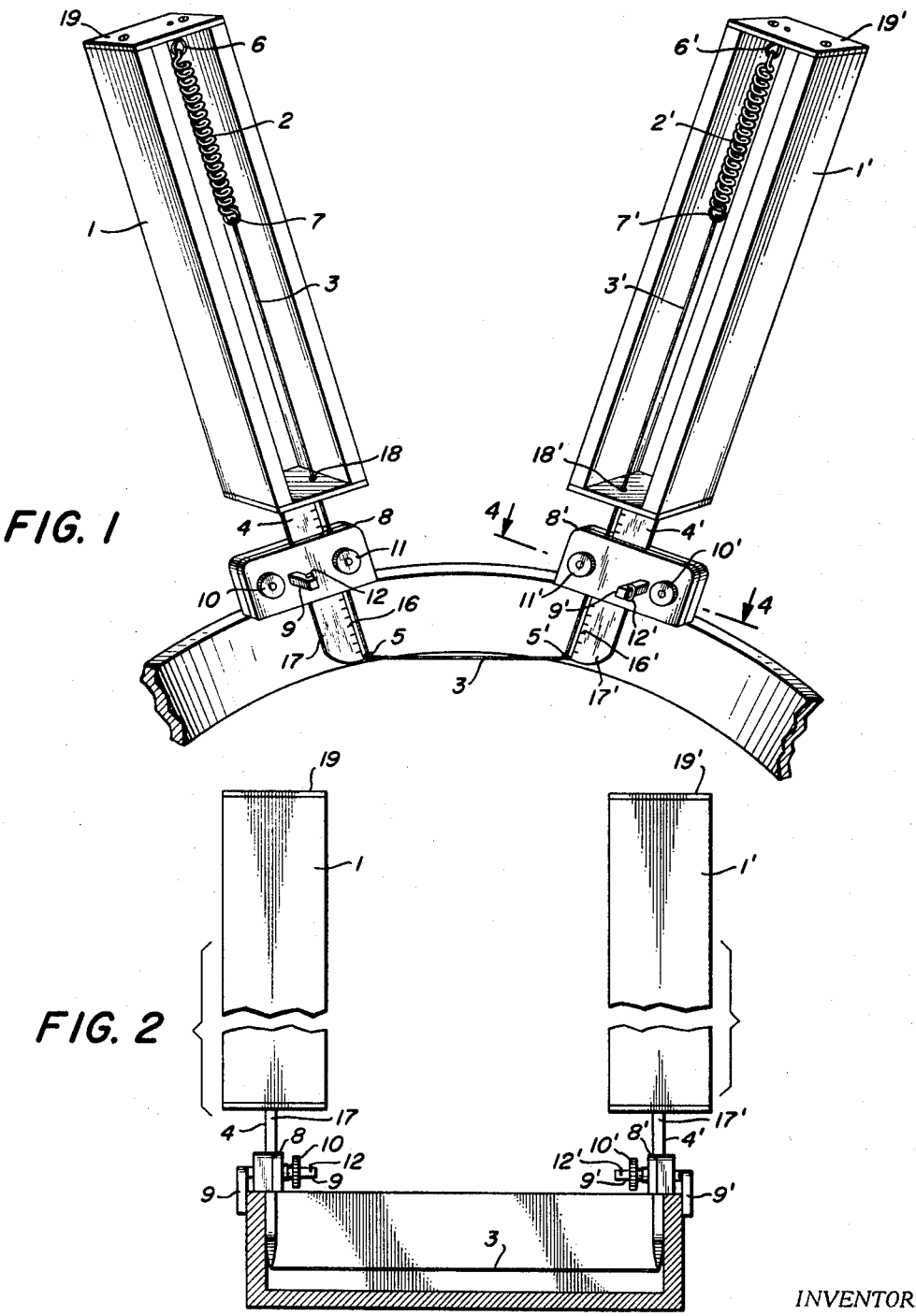

United States Patent Office

3,388,469
MEANS FOR REMOVING OR SLICING LAYERS OF BAKED GOODS FROM CONTAINERS
George W. Neiiendam, 473 E. 16th Place, Costa Mesa, Calif. 92627
Filed July 8, 1965, Ser. No. 470,483
4 Claims. (Cl. 30—116)

ABSTRACT OF THE DISCLOSURE

A mechanical device is provided for unsticking baked goods and other selected materials from the bottom of walled containers such as cake pans. The same device is also used to slice even layers of selected material of any desired thickness while the material remains within its container. The device consists of two knives with hollow handles, each handle containing an extension spring. Attached to each spring and connecting the two knives is a thin cutting strand. The strand is threaded through guides at the extreme tip of each of the knife blades. A depth gauge is attached to each knife blade to control the depth of penetration of the blades and cutting strand within the container. The gauges are adapted to allow for mounting of the device on the container rim. By mounting the device with the knife blades along the inside wall of the container and tracing the perimeter of the container with one or both knives, the cutting strand can be made to pass under the material in the container or through it at any desired depth.

---

This invention relates to a new and useful cutting device, and more particularly to a cutting device to be used to cut under or through selected materials, such as cake and material of similar consistency, while the material remains within its container.

Although the usefulness of this invention will be illustrated with regard to the cutting of cake, it will become apparent that the same device may be used to cut under or through materials of greater or lesser density while these materials remain within their containers. To a significant extent, the varying densities of material through which this device is capable of cutting is limited only by the thicknesses and strengths of the various parts described herein.

The present means of slicing layers of material such as cake generally involve the use of various hand tools such as ordinary knives and semi-manual knives. Some of the larger, more automated bakeries employ a band saw mounted horizontally over a belt onto which are placed the layers to be sliced. All of these methods can be used only after the cake has been removed from its container. Most of these methods are difficult to carry out and produce layers which are not uniform in thickness. The automated methods are too expensive and elaborate for use by housewives and the majority of retail bakeries.

In addition, the sticking of various baked goods to their containers constitutes a problem for professional bakers and housewives alike. In order to avoid sticking, various oils or fats are rubbed into the bottom of the containers before the material to be baked is placed in the container.

It is therefore an object of this invention to provide a cutting device which will allow the operator to cut under selected material, such as cake, within a container, thereby freeing the material by cutting through particles of the material which have stuck to the bottom of the container.

It is another object of this invention to provide a cutting device which would obviate the need to grease the bottom of containers in order to prevent goods to be baked from sticking to the bottom of their containers.

It is another object of this invention to provide a cutting device which will allow the operator to cut under or through selected material, such as cake, within containers of various shapes.

It is another object of this invention to provide a cutting device which will allow the operator to cut uniform sections or layers from selected materials, such as cake, within a container.

It is a further object of this invention to provide a cutting device which will allow the operator to select the desired depth of penetration for cutting out uniform layers of selected materials, such as cake, from within a container.

It is yet a further object of this invention to provide a single tool which will readily allow the operator to cut uniform layers of selected material, such as cake, at desired depths within a container and also to cut under the material should the need arise to free material which has stuck to the bottom of its container.

The novel characteristics of this invention are further set forth in the accompanying drawings and more particularly defined by the claims at the conclusion hereof.

In the drawings:

FIG. 1 is a perspective view of the device in a round container showing one of its uses.

FIG. 2 is a rear view of the device being used inside a square container, the container being shown in a fragmentary sectional view.

FIG. 3 is a detailed perspective view of the depth gauge and a fragmentary perspective view of one of the positioning members and its holder showing the exact positioning of the device on the lip of a container.

FIG. 4 is a detailed sectional view of the depth gauge taken on the line 4—4 of FIG. 1.

FIG. 5 is a bottom view detailing a positioning member, its cutting strand guide, and a depth gauge.

Referring to the drawings wherein like characters of reference designate like parts throughout the several views, one of the devices embodying the invention is shown in FIGURES 1 and 2 with fragmentary views of the same embodiment detailed in FIGURES 3, 4 and 5.

FIG. 1 shows the device in use inside a round container. In this particular embodiment of the device there are two matched mounting structures having all parts alike. Common to each of these matched mounting structures is cutting strand 3 which extends between them. This strand is preferably of nylon thread or similar material such as common fishing tackle. Strands capable of supporting a 20 to 40 pound pull have been found to be entirely adequate for this purpose.

The length of the cutting strand 3 between the guides 5 and 5' may be varied by simply pulling the matched mounting structures apart and bringing them together again, as suggested in FIG. 1. As the mounting structures are pulled apart, the extension springs 2 and 2', which are attached to the top plate 19 and 19' of holders 1 and 1' by hooks 6 and 6', expand and emit a correspondingly greater length of cutting strand 3 through apertures 13, 13' and 18, 18'. When the mounting structures are brought closer together, as when having passed the diameter points in tracing the perimeter of a round container, the springs contract and draw into their respective holders 1 and 1' correspondingly greater lengths of cutting strand 3. Cutting strand 3 reaches its maximum length between guides 5 and 5' when extension springs 2 and 2' are stretched to the limits of holders 1 and 1'. Conversely, cutting strand 3 is at its minimum length between guides 5 and 5' when extension springs 2 and 2' are in their normal relaxed state. It is this compensating action of extension springs 2 and 2' which allows the length of cutting strand 3 to be varied within the container while remaining taut at all times, thereby enabling the device to be used in rounded containers as well as in those having right angles.

Cutting strand 3 is left exposed and is attached to extension springs 2 and 2' by rings 7 and 7'. This allows ease of access to said cutting strand for cleaning and replacement purposes. In actual use, however, cutting strand 3 very rarely requires replacement.

Guides 5 and 5' are round in shape and only wide enough in diameter to allow cutting strand 3 to move freely through them. Guides 5 and 5' are welded to the extreme front tip of positioning members 4 and 4'. It can be seen that attaching guides 5 and 5' at this particular location and threading cutting strand 3 through them in the manner shown in FIG. 1 will allow said cutting strand to lie at the very base of the container, should this depth of penetration be desired. The placing of cutting strand 3 at the base of the container enables the device to cut under selected material, such as cake, within the container, thereby freeing any such material which may stick to the bottom of said container.

Depth gauges 8 and 8' are in the shape of a clamp and are attached to positioning members 4 and 4' by thumb screws 10, 11 and 10', 11'. By slightly loosening one of said thumb screws, the corresponding depth gauge may be made to slide easily up and down its positioning member. Depth measurement marks 16 and 16' are read off the front edge of the corresponding positioning member and the gauges are adjusted accordingly before mounting the device onto the lip of a container. Tightening the thumb screws by hand is sufficient to hold the depth gauges firmly in place. The depth gauges may be removed completely from the positioning members by unscrewing thumb screws 11 and 11'.

It may be seen from FIGS. 2, 3, 4 and 5 that one side of the depth gauge, 15', is considerably thicker than the other, 14'. This is true for both depth gauges and is to insure that the entire mounting structure has a firm base on which to rest when the device is mounted as shown in FIGS. 2 and 3.

Arms 9 and 9' extend through depth gauges 8 and 8', as do also thumb screws 10, 11 and 10', 11'. The thumb screws are threaded, as shown in FIG. 4. Arms 9 and 9', however, have a completely square cross section and are fitted through slots running through sides 14, 15 and 14', 15'. Arms 9 and 9' slide within their respective slots in a wide enough range to accommodate container lips of various widths. Pins 12 and 12' are used to hold arms 9 and 9' within their respective slots. Said pins are inserted through holes drilled in arms 9 and 9' and bent around said arms.

Arms 9 and 9' may be adjusted manually to fit container lips of varying width. Because of their square cross section and peculiar shape, a small force directly in line with and parallel to the long axes of said arms is sufficient to slide said arms through their respective slots. A force placed a little below, or at an angle to said axes, however, will not cause said arms to slide within their slots. In FIG. 2, therefore, the arms 9 and 9', once set at a particular width to accommodate the lip of the container, remain at this exact width all during the time the mounting structures are guided around the perimeter of the container. It has been found that this holding function of the arms on the side of the lip of the container, while not essential to the operation of the device, serves to steady the mounting structures and thereby simplify the cutting process. This is especially true in round containers.

Positioning members 4 and 4' may be made from any suitable material, such as stainless steel. Said positioning members have a cutting edge at 17 and 17'. The positioning members are attached by welding to the bottom of holders 1 and 1'. The holders may be made from a single piece of any suitable metal, or wood may be used where appropriate. The depth gauges 8 and 8' and arms 9 and 9' may also be made from any suitable metal.

In the operation of this device in a circular container positioning members 4 and 4' are inserted close together and at desired depths along the inside side wall as shown in FIG. 1. One or both of the mounting structures may be passed along the top of said side wall, thereby tracing the perimeter of the cake and causing cutting strand 3 to pass through the material within the container at the desired depth. In a square shaped container the same procedure for cutting the material in the container may be followed except that the entire perimeter need not be traced by the mounting structures and the positioning members are inserted along opposite walls, as shown in FIG. 2.

While this invention has been described with particular reference to the construction shown in the drawings and while various changes may be made in the detailed construction, it shall be understood that such changes shall be in the spirit and scope of the present invention as defined by the appended claims.

Having described the invention, what I claim is:

1. A device for cutting under or through cake and other selected material when such material is in a container having a side wall, said device comprised of two matched mounting structures, said mounting structures each comprised of a positioning member attached to a holder, said positioning members to be inserted along the inside wall of said container, a cutting strand extending between guides attached to the extreme forward tip of said positioning members, said cutting strand attached to extension springs contained within said holders thereby connecting the mounting structures, and depth gauges mounted on said positioning members to allow slideable, vertical adjustment of the positioning members within said container, said depth gauges adapted to engage the rim of the container allowing the mounting structures to be guided around the rim of the container thereby causing the cutting strand to become taut due to spring tension, the arrangement of the cutting strand between the springs also allowing for varying amounts of cutting strand to be emitted within the container to accommodate containers of various sizes and shapes as the springs are extended or relaxed.

2. A device for cutting under or through cake and other selected material when such material is in a container having a side wall, said device comprised of two matched mounting structures, said mounting structures each comprised of a positioning member attached to a holder, said positioning members to be inserted along the inside wall of said container, a cutting strand attached to a spring tensioning device located in each holder and thereby connecting the mounting structures, said cutting strand threaded through guides located at the forward tip of the positioning members, said positioning members having slideable depth gauges attached, said depth gauges adapted to engage the rim of the container to allow mounting of the device on the rim of the container and to provide for vertical adjustment of the positioning members within the container, the device operating when one or both of the mounting structures is traced around the perimeter of the container, the cutting strand becoming taut and capable of continuous adjustment to the dimensions of the container as a result of the corresponding expansion and relaxation of the spring tensioning device.

3. A device for cutting under or through cake and other selected material when such material is in a container having a side wall, said device comprised of two mounting structures, each structure comprised of a holder and a positioning member, said holder containing an extension spring, said positioning member having a slideable depth gauge attached, said depth gauges adapted to engage the rim of the container, said mounting structures connected by a cutting strand attached to said extension springs, said cutting strand threaded through guides located at the extreme forward tip of each positioning member, said device operating when the perimeter of the container is traced with one or both mounting structures after said mounting structures are mounted on the rim of the container and the positioning members inserted along the inside wall of said container, thereby causing said springs to emit an amount of cutting strand made taut by spring tension and capable of varying in length to conform to the distance between the guides at the forward tip of the positioning members, said distance being a variable of the size and shape of the container, the amount of cutting strand emitted between the guides varying because of attachment of the cutting strand to the springs, said springs being in a state of expansion as required by the dimensions of the container.

4. A device for cutting under or through cake and other selected material when such material is in a container having a side wall, the device being comprised of two mounting structures, each structure comprised of a holder and an attached positioning member, each holder containing an extension spring to which is attached a cutting strand thereby connecting each mounting structure, said cutting strand extending down from the springs and through guides attached to the extreme forward tip of the positioning members, each positioning member having an adjustable depth gauge mounted on it to control for the depth of penetration of the positioning member within the container, said depth gauges also adapted to allow the mounting structures to engage the rim of the container, the device being operated by mounting the mounting structures on the rim of the container with the positioning members inserted into the container along the inside wall and tracing the perimeter of the container with one or both mounting structures, the cutting strand being made taut due to the spring tension caused by pulling the mounting structures apart, said arrangement of the cutting strand between the springs also providing for a varying of the length of the cutting strand emitted within the container to accommodate containers of varying sizes and shapes, the maximum length of the cutting strand being attained within the container when the mounting structures are pulled as far apart as possible so that the springs are extended to the full length allowed by their respective holders, continuous adjustment of the length of the cutting strand to the dimensions of the container being assured by said spring action.

References Cited
UNITED STATES PATENTS

| | | |
|---|---|---|
| 2,303,116 | 11/1942 | Engle. |
| 2,759,261 | 8/1956 | Setecka. |
| 2,762,122 | 9/1956 | Hermann. |
| 2,987,598 | 6/1961 | Chace. |
| 2,964,844 | 12/1960 | Steward et al. _____ 30—116 |

ANDREW R. JUHASZ, *Primary Examiner.*